United States Patent [19]
Tyler

[11] Patent Number: 6,068,554
[45] Date of Patent: May 30, 2000

[54] HAND MANIPULATED DUAL CONTROLLER ASSEMBLY

[76] Inventor: Kelly D. Tyler, P.O. Box 841, Jamul, Calif. 91935

[21] Appl. No.: 08/978,362

[22] Filed: Nov. 25, 1997

[51] Int. Cl.[7] ...................................................... G09G 5/08
[52] U.S. Cl. ............................................. 463/38; 345/161
[58] Field of Search ................................. 463/36, 37, 38; 273/148 B; 345/161

[56] References Cited

U.S. PATENT DOCUMENTS

| | | | |
|---|---|---|---|
| 4,933,670 | 6/1990 | Wislocki | 463/37 |
| 5,643,087 | 7/1997 | Marcus et al. | 273/148 B |
| 5,716,274 | 2/1998 | Goto et al. | 463/37 |
| 5,786,807 | 7/1998 | Couch et al. | 273/148 B |
| 5,820,462 | 10/1998 | Yokoi et al. | 273/148 B |
| 5,874,906 | 2/1999 | Willner et al. | 463/36 |

*Primary Examiner*—Valencia Martin-Wallace
*Assistant Examiner*—John Paradiso
*Attorney, Agent, or Firm*—Charles C. Logan, II

[57] ABSTRACT

A hand manipulated dual controller assembly for use with action video games. It has a base with a trackball type controller mounted in one recess in the top surface of the base and a joystick type controller mounted in another recess in the top surface of the base. By using the joystick controller, the player can separately move the action video game character in any desired direction and by using the trackball controller allow the character to look with his eyes in any desired direction. The top surface of the base surrounding the trackball type controller is convex and it allows a player's cupped hand to rest on the top of the base while that hand is actuating the trackball controller and the surrounding buttons. That hand also stabilizes the position of the base and prevents the base from being pushed around when the player uses the joystick controller with his other hand.

7 Claims, 2 Drawing Sheets

HAND MANIPULATED DUAL CONTROLLER ASSEMBLY

BACKGROUND OF THE INVENTION

The invention relates to video games and more specifically to a hand operated controller for playing computer video games.

The early video games had a display screen whose graphics portrayed a two dimensional scene. Some of these were hand held self-contained portable units.

Improved action video games, such as Nintendo, require a separate controller that is connected to a console containing a PCB upon which an IC is mounted. The console is connected to a television or monitor and the game is displayed on its screen. The controller is only capable of moving a character or object to the left or right, up and down, and forward or rearward.

More recently action video games have been created having three dimensional scenes. Many of these have been designed to be played on a computer and the screen of its monitor. The player still uses a controller or joystick in one hand that only moves the character or object to the left or right up or down, and forward or rearward. The excitement of the action video games causes the player to physically push and pull the controller or joystick all around while playing the video game. The joystick, by its design, is unstable and as a result the player usually has to hold the base of the controller or joystick with one hand to stabilize it while operating the controls with his other hand. These action video games often require the player to use his free hand to use the keyboard of the computer to produce special moves to the character or object being moved in the game. None of the present-day computer games have controllers that allow the character to separately move in any direction and also allow the character to look with his eyes in any desired direction.

It is an object of the invention to provide a novel hand manipulated controller that incorporates a trackball type of controller and a joystick controller in a single base.

It is also an object of the invention to provide a novel hand manipulated controller that eliminates the need to use the keyboard or mouse of a computer while playing an action video game. It is another object of the invention to provide a novel hand manipulated dual controller that allows the video game character to separately move in any desired direction and allow the character to look with his eyes in any direction.

It is an additional object of the invention to provide a novel hand manipulated controller that allows the player to operate the joystick controller with one hand while he rigidly holds the base of the controller with his other and also operates the trackball controller with the same hand.

SUMMARY OF THE INVENTION

The novel hand manipulated dual controller assembly has a pair of laterally spaced recesses formed in the top surface of a single base member. A joystick type of controller is mounted in one of these recesses and a trackball type of controller is mounted in the other recess. The vertical axes of the respective controllers are positioned a predetermined distance apart from each other. The singular base and the proximity of the two controllers to each other allows a player to operate the joystick controller with one hand while the other hand rests on the top surface of the base and holds it rigidly and prevents the base from moving about. While the second hand is rigidly holding the base, that hand can also operate the trackball controller and its many surrounding buttons.

The trackball controller eliminates the need to use the keyboard of a computer when playing an action video game.

The joystick controller allows the video game character to separately move in any direction. The joystick controller also has a number of trigger buttons mounted thereon for performing additional functions of the game. The trackball controller allows the game character to look with his eyes in any desired direction. It is surrounded by numerous trigger buttons that also perform specific functions for the video game.

The trackball controller allows the character to look around 360 degrees independently of the travel motion of the character. The character can look to the left and to the right or look up or look down. The trackball control is a proportional analog control. If the players fingers move across the ball causing it to travel to the left 180 degrees, the character will turn his head 180 degrees to the left. Likewise, if the players hand travels across the ball 180 degrees to the right, the character will turn his head and look around 180 degrees to the right. By rotating the ball forwardly the character will look downwardly a coordinated amount according to how much the ball is rotated forwardly. Conversely if the ball is rotated rearwardly, the character will look up the number of degrees the ball is rotated to the rear.

DESCRIPTION OF THE PREFERRED EMBODIMENT

Figure 1:
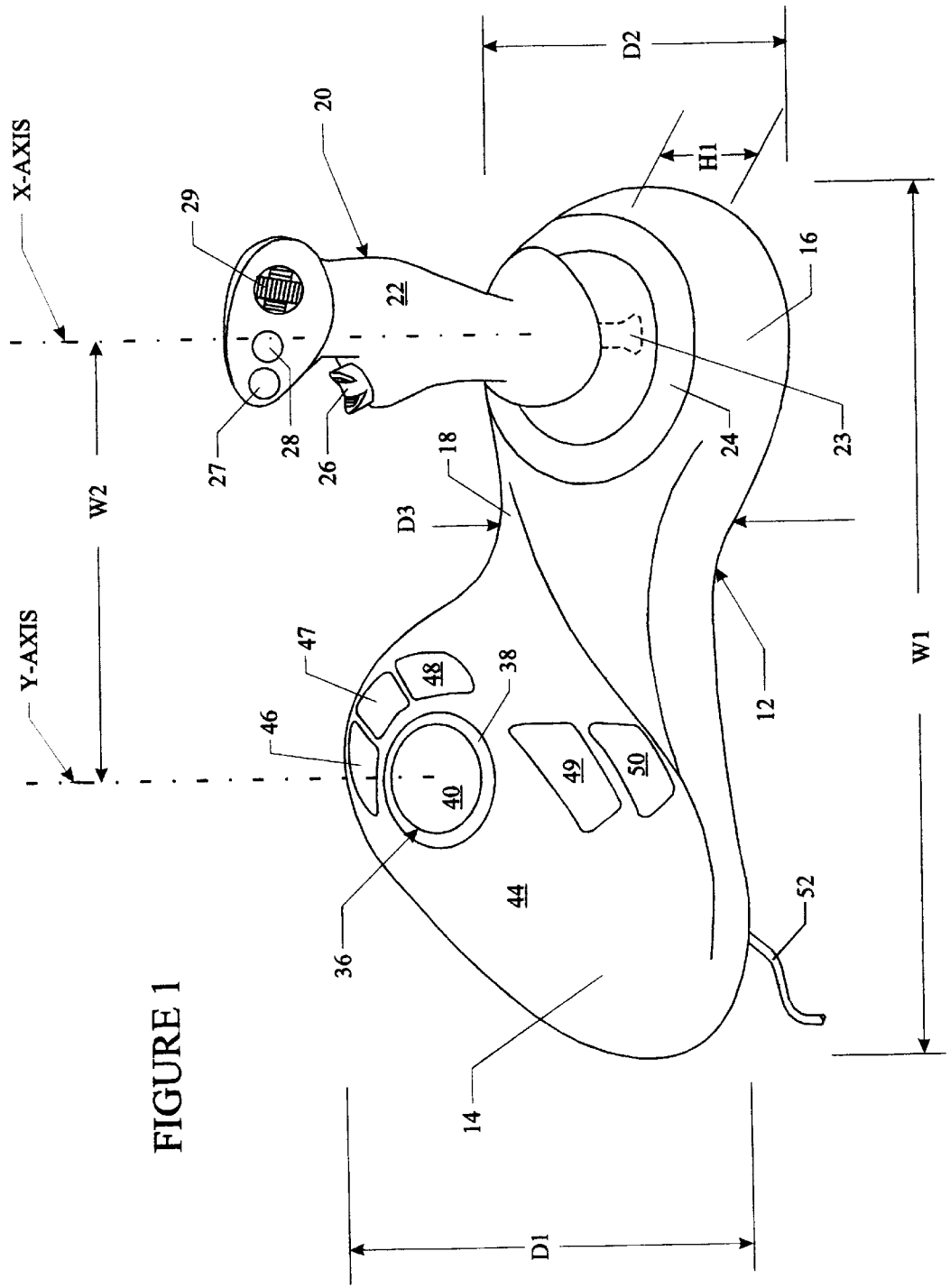
FIG. 1 is a front perspective view of the novel hand manipulated dual controller assembly.

The novel hand manipulated dual controller assembly is generally designated numeral 10 and it will be described by referring to FIGS. 1 and 2 of the drawings.

Dual controller assembly 10 has a base 12 that may be hollow inside and having its bottom opening hidden by a bottom cover (not shown). Base 12 has a width W1 in the range of 5–20 inches, a depth D1 in the range of 3–12 inches and a height H1 in the range of ¾–3 inches. Base 12 has a trackball mounting portion 14, a joystick mounting portion 16 and a connecting portion 18. Joystick mounting portion 16 has a depth D2 that is less than D1. Connecting portion 18 has a depth D3 that is less than D2.

Joystick type of controller 20 has an upright oriented joystick 22 having a bottom end 23 mounted in recess 24. Joystick 22 has a height H5 in the range of ½–8 inches. Bottom end 23 is connected to conventional universal joint structure (not shown). A boot 25 covers recess 24. Joystick 22 has a vertical X-axis and several buttons 26,27, 28 and 29 that can be programmed.

Trackball controller 36 is mounted in a recess 38 formed in the top surface of base 12. It has a rollerball 40. Recess 38 has a height H2 in the range of ¼–2 inches and rollerball 40 has a diameter D4 in the range of ½–4 inches. Trackball controller 36 has a vertically extending Y-axis. There is a distance W2 between the X-axis and the Y-axis and it is in the range of 1–15 inches. The top surface 44 of base 12 surrounding the trackball type controller 36 is convex and preferably configured to receive the cupped hand of a person playing the action video game. A cord 52 extends from base 12 and its free end would be connected to a computer 54.

Figure 2:
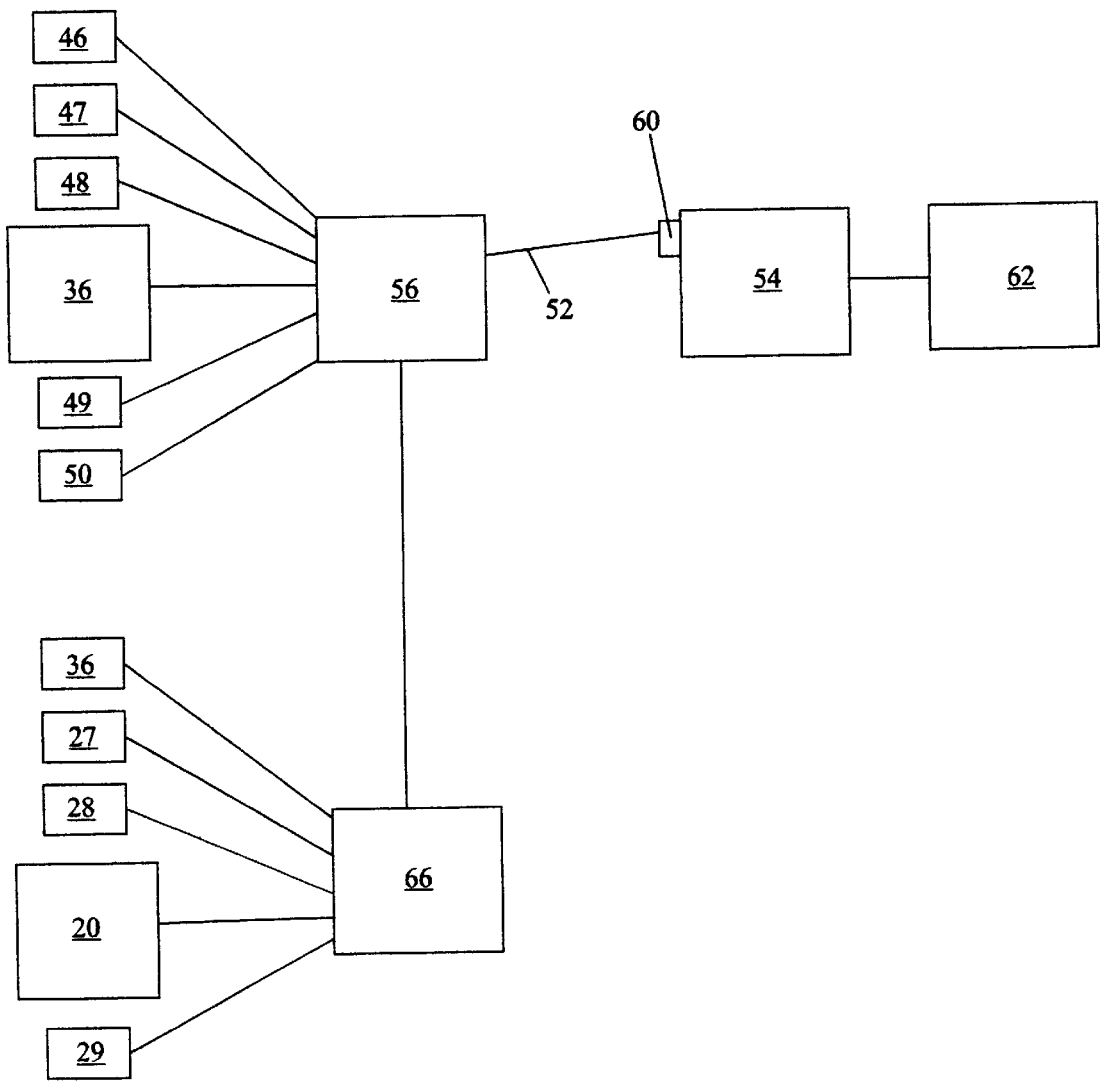
FIG. 2 is a schematic electrical drawing showing the principal components of the dual controller assembly and the manner in which they are connected to a computer.

FIG. 2 illustrates the schematic electrical circuit of the dual controller assembly 10. Trackball controller 36 and buttons 46,47,48,49 and 50 are electrically connected to PC board 56 and it has an integrated circuit (IC) mounted thereon. PCB 56 would be mounted in base 12. Electrical cord 52 is connected to the game port 60 of computer 54 and monitor 62 is connected to computer 54. Joystick 20 and control buttons 26,27,28 and 29 are connected to board 66 which may or may not have an integrated circuit (IC) mounted thereon. Printed circuit board 62 is also connected to PCB 56.

What is claimed is:

1. A hand manipulated dual controller assembly for outputting control information to a graphic generation device for control of graphic images, said dual controller assembly comprising:

a single base member having a width W1 in the range of 5–20 inches, a depth D1 in the range of 3–12 inches, and a height H1 at its highest point in the range of ¾–3 inches, said base having a front edge, a rear edge, a left edge, a right edge, and a top surface;

a trackball type controller that allows a video game character to look with his eyes in any desired direction; said trackball type controller being mounted in a recess in said top surface of said base member and it has a vertical Y-axis; said recess having a height H2 in the range of ¼–2 inches and a rollerball having a diameter D4 in the range of ½–4 inches is received in said recess; said rollerball being spherically rotatable 360 degrees in any direction independent of said base member;

means for sensing rotation of said rollerball relative to said base member and for creation of rotational information indicative of the direction that a game character may be looking with his eyes and amount of rotation of said rollerball;

a joystick type controller that allows a video game character to move in any desired direction; said joystick type controller being mounted in a recess in said top surface of said base member and it has an upright oriented joystick handle having a top end, a bottom end, a vertical Z-axis and a height H5 in the range of ½–8 inches;

the distance between said Y-axis and said Z-axis is W2 and is in the range of 1–15 inches;

means for sensing linear and/or rotational movement of said joystick handle relative to said base member and for producing electrical output signals indicative of linear and rotational hand input force directed against said joystick handle that allows a video game character to move in any direction; and said top surface of said base member surrounding said recess for said trackball type controller has a surface contoured to mate with the bottom surface of a person's hand in its cup-shaped state.

2. A hand manipulated dual controller assembly as recited in claim 1 wherein the height of said top surface of said base member gradually gets smaller from said recess for said trackball controller as said top surface extends to said rear edge of said base.

3. A hand manipulated dual controller assembly as recited in claim 1 further comprising at least one first primary control button for one of the middle three fingers of a person's hand and said first primary control button is positioned in said top surface of said base member at a position between said recess of said trackball type controller and said front edge of said base member.

4. A hand manipulated dual controller assembly as recited in claim 3 further comprising at least one secondary control button for the thumb of a person's hand and said secondary control button is positioned in said top surface of said base member at a position both rearwardly and to the right or left of said Y-axis of said trackball type controller.

5. A hand manipulated dual controller assembly as recited in claim 1 wherein said joystick handle has at least one control button positioned adjacent the top end of said joystick handle for the thumb of a person's hand.

6. A hand manipulated dual controller assembly as recited in claim 1 wherein said joystick handle has at least one control button positioned adjacent the top end of said joystick handle for the index finger of a person's hand.

7. A hand manipulated dual controller assembly as recited in claim 1 wherein said base member has a trackball mounting portion having a maximum depth D1, a joystick mounting portion having a maximum depth D2 and intermediate said trackball mounting portion and said joystick mounting portion is a connecting portion having a depth D3; D1 is always greater than D2 and D2 is in the range of 3–8 inches.

* * * * *